UNITED STATES PATENT OFFICE.

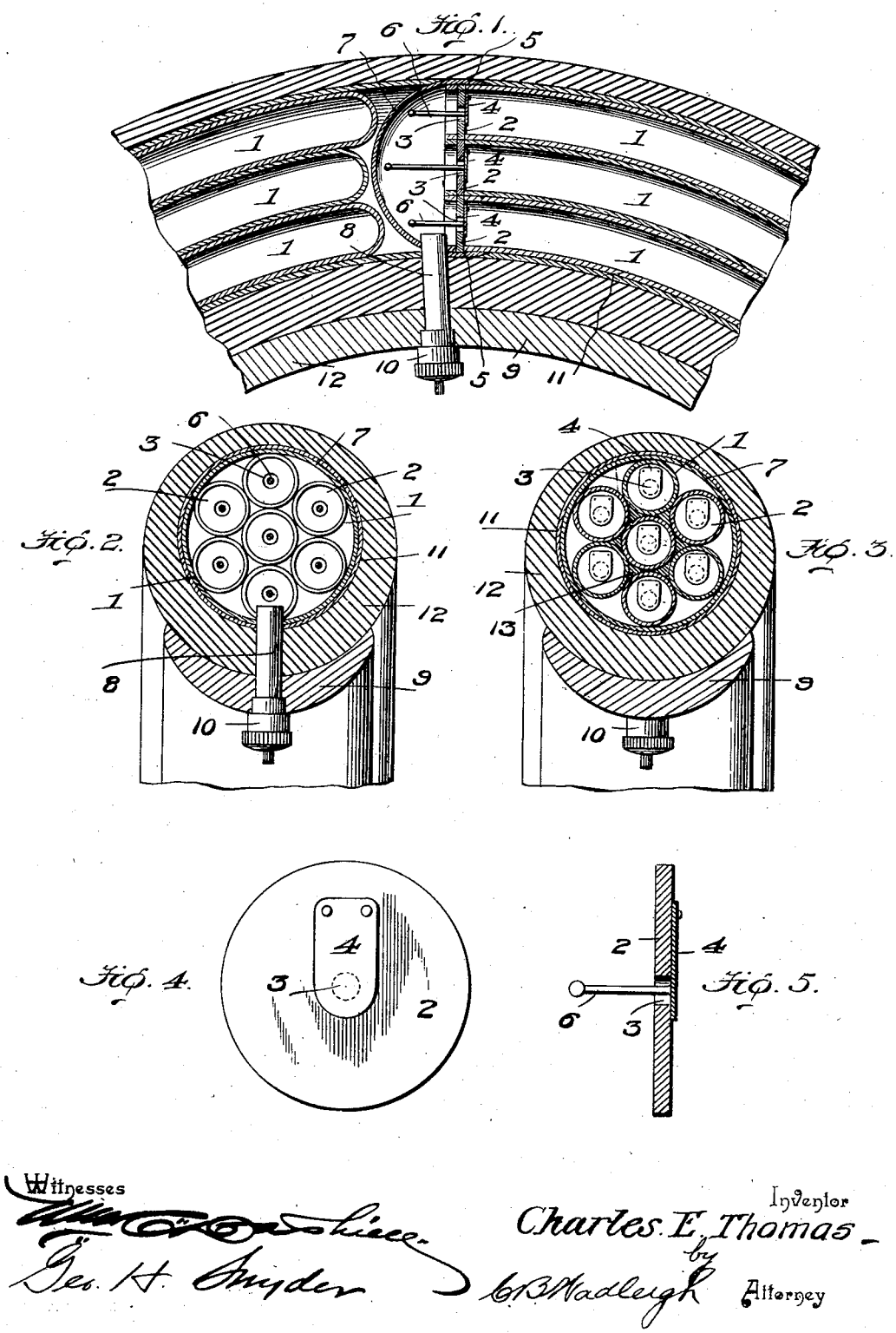

CHARLES E. THOMAS, OF TUCSON, ARIZONA TERRITORY.

PNEUMATIC TIRE.

SPECIFICATION forming part of Letters Patent No. 697,564, dated April 15, 1902.

Application filed September 23, 1901. Serial No. 76,231. (No model.)

*To all whom it may concern:*

Be it known that I, CHARLES E. THOMAS, a citizen of the United States, residing at Tucson, in the county of Pima and Territory of Arizona, have invented certain new and useful Improvements in Pneumatic Tires; and I do hereby declare the following to be a full, clear, and exact description of the invention, such as will enable others skilled in the art to which it appertains to make and use the same.

This invention relates to certain new and useful improvements in tires for bicycles, automobiles, and other wheeled vehicles of that class in which are provided a plurality of inflatable tubes inclosed within a surrounding tube; and the present invention has for its objects, among others, to construct a tire of this character in which the inner tubes shall be entirely independent or separate so far as efficiency is concerned, each being provided with its own valve, and the ends of the several smaller tubes being connected to a ball or pocket or chamber, which latter is provided with a valve for inflation, so that as the said ball or pocket is fed with the air it is forced into the several smaller tubes until they are all filled, the valves of the said tubes being self-closing—that is, closed by the pressure of the air from within. I provide these valves each with a projecting stem, by which the valve of any tube may be opened by pressure upon the stem thereof by compression of the elastic ball or pocket, to which the ends of the tubes are connected. By this arrangement the several tubes are automatically filled to a uniform degree, so that the tire will become evenly hard and plump. In case a puncture occurs it will ordinarily be in but one of these smaller inner tubes, and the remaining tubes will be sufficient to enable the rider to continue his journey.

Other objects and advantages of the invention will hereinafter appear, and the novel features thereof will be specifically defined by the appended claims.

The invention in its preferred form is clearly illustrated in the accompanying drawings, which, with the numerals of reference marked thereon, form a part of this specification, and in which—

Figure 1 is a substantially central longitudinal section through a portion of a tire embodying my invention. Fig. 2 is a cross-section thereof. Fig. 3 is a cross-section through the tire at a different point, showing a slightly-modified form of construction. Fig. 4 is an enlarged face view of one of the valves. Fig. 5 is a substantially central section through the same.

Like numerals of reference indicate like parts throughout the several views.

Referring now to the details of the drawings, 1 designates a series of tubes of any required diameter, and although herein shown as being seven in number it is evident that this number may be varied and more or less may be used, as may be deemed most expedient. These tubes, which are of yielding material, as rubber, are each provided with a closure at one end, the other end being by preference closed, as seen in Fig. 1, although the manner of closing this end is not essential. The closures mentioned as shown in this instance each comprises a disk 2 with an opening 3, closed by a valve 4, which may be of any of the well-known or approved forms of construction, being a flap-valve opened by the pressure brought against its outer face and closed by the pressure from within the tube outward, as is common in this class of devices. The valve may be hinged or pivoted, or it may be a flexible valve, both being common in the art. These disks are inserted through openings 5 in the ends of the tubes, said openings being from opposite sides of the tubes and the disks held therein by frictional engagement of the parts or cemented or otherwise fastened.

Each valve is shown as provided with a stem 6 of sufficient rigidity to permit of its being pushed inward when it is desired to exhaust the air from any one tube.

7 is a pouch, ball, or pocket to which the valved ends of the tubes are secured in any suitable manner, and 8 is a valve of the usual construction extending into the said ball or pouch and outward through the rim 9, where it is provided with a cap 10 in the usual way. This pouch or ball is of rubber or analogous material and may be of any desired capacity. It may be elongated, if found necessary, but about the shape shown is preferable.

The style of tire within which the above-described improvement is applied is non-essential. In this instance I have chosen to show it as inserted within an inner tire 11, inclosed within the outer tire 12; but the improvements may be employed in connection with other forms of tire, such as the "clincher," or others of well-known construction.

In practice the ball is inflated by the pump applied to the stem of the valve 8 in the usual way. The air fills the ball, and the valves of the various tubes 1 are opened and these tubes are filled uniformly and the egress of air prevented by the valves, which, as above stated, are self-closing and close by the pressure of the air contained within the said tubes when the pump is removed from the stem 8 of the valve. When it is desired to deflate any one or all of the tubes 1, the ball or pouch is grasped by the hand and by pressing upon any one or all of the stems 6 the valve or valves may be opened and the air allowed to escape from the tube or tubes into the ball, from which it is allowed to escape through the valve 8, as will be readily understood.

From the above it will be seen that I have devised a novel and cheap form of tire that will be more durable and efficient than the old form, and while the structural embodiment of the invention, as hereinbefore described and as shown in the drawings, is what I at this time consider the preferable it is evident that changes, variations, and modifications in detail may be resorted to without departing from the spirit of the invention or sacrificing any of its advantages, and I therefore reserve the right to make such changes, variations, and modifications as come properly within the scope of the protection prayed. For instance, as seen in Fig. 3, I may sometimes employ a sustainer for the outer tubes 1, as seen at 13, within which the innermost of the tubes is supported. This gives more stability to the tubes and serves to hold them in their proper relative positions. Other minor changes I should consider as coming properly within the spirit of my invention.

What is claimed as new is—

1. A tire embodying a series of tubes, each with a valve, and a pouch common to all of said valves and tubes, said pouch inclosing the ends of the tubes, and inclosed by the tire.

2. A tire of the character described, embodying a series of tubes, an inflating-valve for one end of each tube and a flexible pouch inclosing said valves and stems, said pouch provided with an inflating-valve and inclosed by the tire.

3. A tire embodying a series of tubes each provided with a valve at one end, said tubes and valves inclosed by an inflating-pouch which is inclosed by the tire and means on the valves within the pouch permitting of deflation of the tubes.

4. In a tire of the character described, a series of tubes and a series of valves each provided with a projecting stem, and a pouch inclosing said tubes and valves, said pouch inclosed by the tire.

5. In a tire a plurality of tubes closed at one end, a valve in the other end of each of said tubes, a stem projecting from each of said valves, and a flexible pouch embracing the said valved ends of the tubes and the stems and secured to the said ends, as set forth.

In testimony whereof I affix my signature in presence of two witnesses.

CHARLES E. THOMAS.

Witnesses:
THOMAS M. SMITH,
ABRAHAM M. FRANKLIN.